(No Model.) 4 Sheets—Sheet 1.
A. KAISER.
GRAIN METER.
No. 251,238. Patented Dec. 20, 1881.
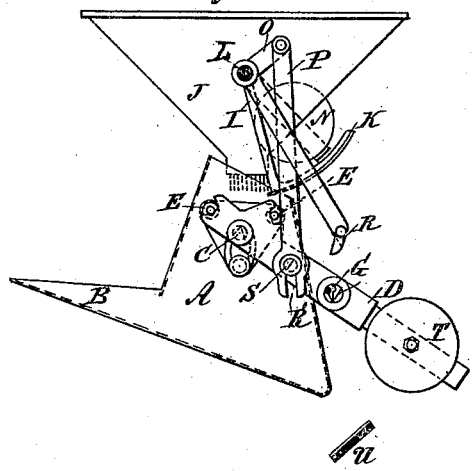
Fig. 1
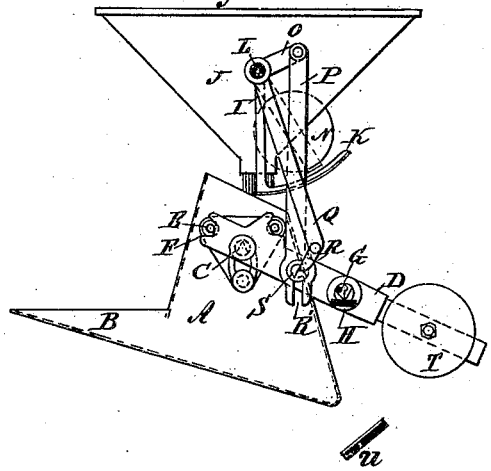
Fig. 2
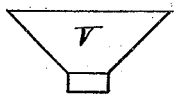
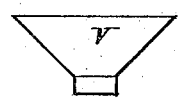
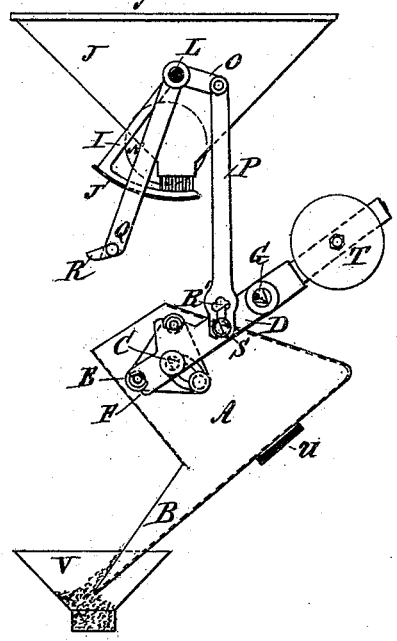
Fig. 3
WITNESSES:
C. Sedgwick
J. H. Scarborough
INVENTOR:
A. Kaiser
BY Munn & Co.
ATTORNEYS.

(No Model.)

4 Sheets—Sheet 2.

A. KAISER.
GRAIN METER.

No. 251,238. Patented Dec. 20, 1881.

Witnesses
C. Sedgwick
J. H. Scarborough

Inventor:
A. Kaiser
by Munn & Co.
Attorneys.

(No Model.) 4 Sheets—Sheet 3.
A. KAISER.
GRAIN METER.
No. 251,238. Patented Dec. 20, 1881.
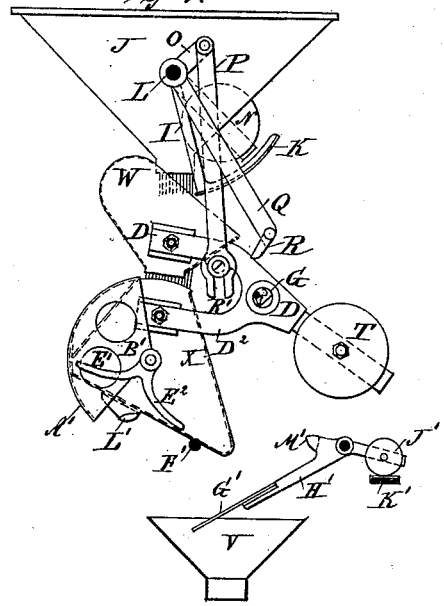
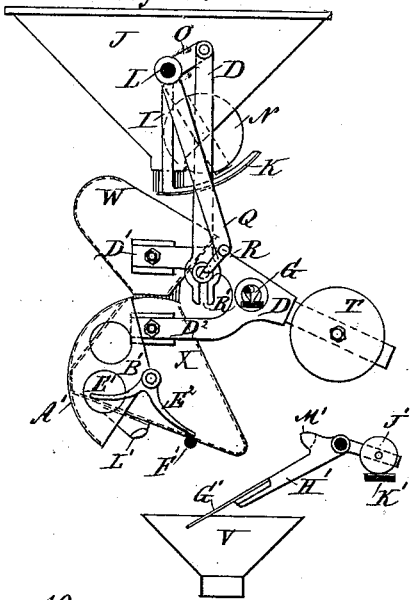
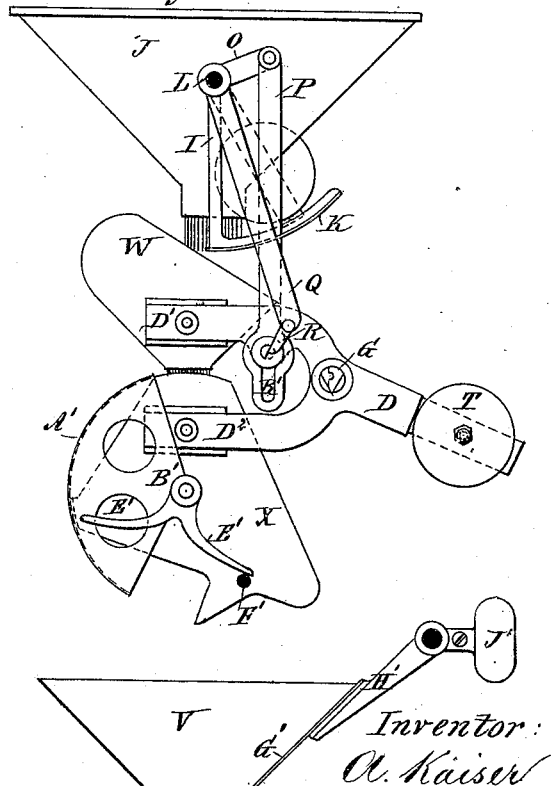

(No Model.)

A. KAISER.
GRAIN METER.

No. 251,238. Patented Dec. 20, 1881.

Witnesses:
C. Sedgwick
J. H. Scarborough

Inventor:
A. Kaiser
by Munn & Co.
Attorneys.

UNITED STATES PATENT OFFICE.

ALEXANDER KAISER, OF MUNICH, BAVARIA, GERMANY.

GRAIN-METER.

SPECIFICATION forming part of Letters Patent No. 251,238, dated December 20, 1881.

Application filed March 24, 1881. (No model.)

*To all whom it may concern:*

Be it known that I, ALEXANDER KAISER, of Munich, in the Empire of Germany, have invented a new and Improved Apparatus for Weighing and Measuring Cereals, of which the following is a specification.

The object of my invention is to provide a new and improved apparatus for weighing and measuring cereals or other granulated or pulverized substances.

Figure 4:
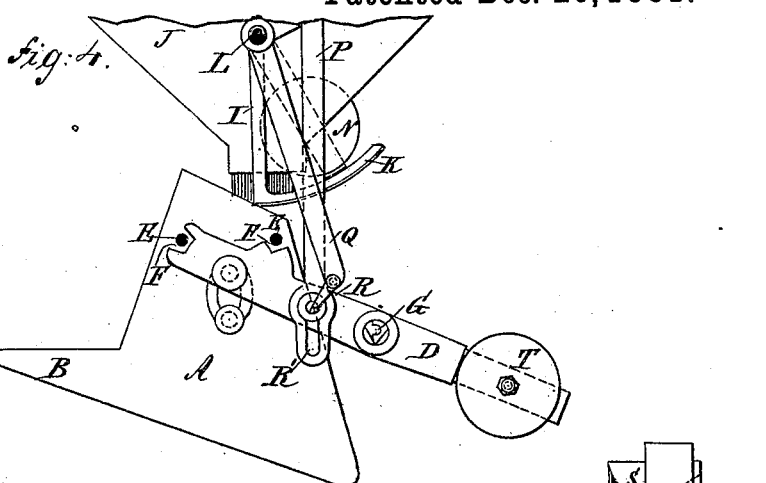
Figure 5:
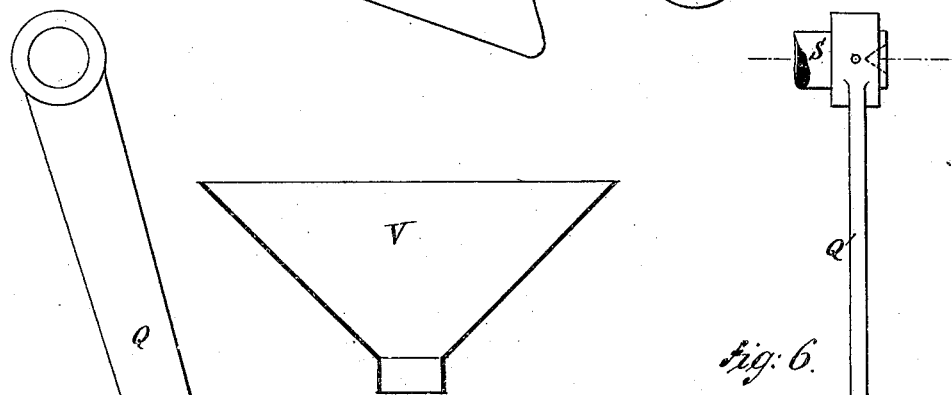
Figure 6:
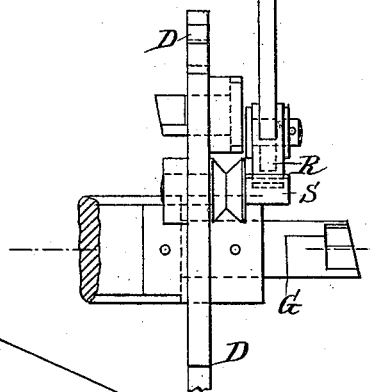
Figure 11:
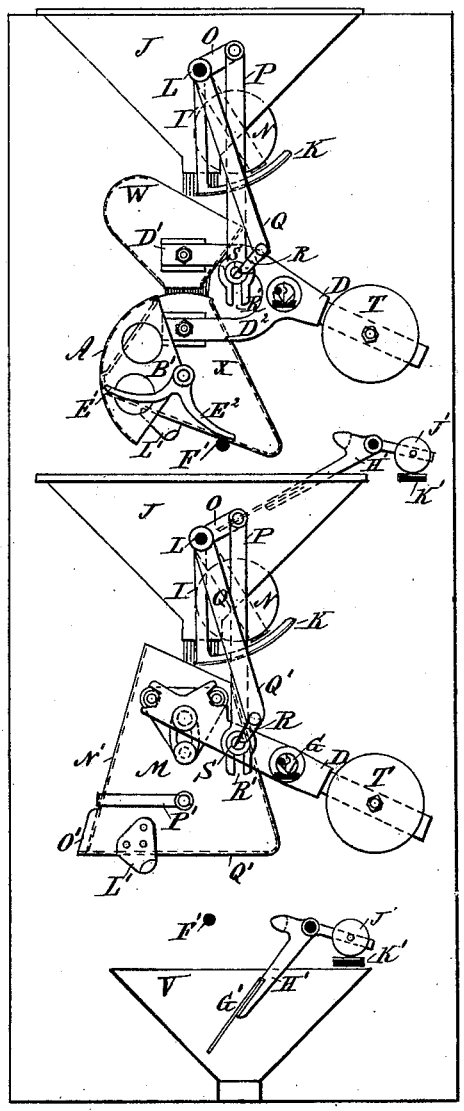

In the accompanying drawings, Figure 1 is a side elevation of my improved measuring and weighing device, showing the scoop raised and the gate of the hopper entirely open. Fig. 2 is a side elevation of the same, showing the scoop lowered a short distance and the gate of the hopper partially closed. Fig. 3 is a side elevation of the same, showing the scoop tilted so that its contents can pass into a receptacle below it, and the gate of the hopper is shown closed. Fig. 4 is a side elevation of a slight modification of my improved measuring and weighing device, showing the scoop raised and the gate of the hopper partially closed. Fig. 5 is a detail side elevation of the scale-beam and the lever connected therewith for regulating the movement of the gate of the hopper. Fig. 6 is an end elevation of the same. Fig. 7 is a side elevation of a modification of my improved device for weighing and measuring, provided with a sliding gate on the scoop, the gate of the hopper being shown open, the scoop raised, and its gate closed. Fig. 8 is a side elevation of the same, showing the scoop slightly lowered and the gate of the hopper partially closed. Fig. 9 is a side elevation of the same, showing the scoop tilted, its gate open, the scoop held in position, and the gate of the hopper entirely closed. Fig. 10 is a side elevation of a slight modification of the device shown in Figs. 7, 8, and 9, the hopper being partially lowered and the gate of the hopper partially closed. Fig. 11 is a side elevation of two of my improved measuring devices, of which the upper one is used for measuring and the lower one for weighing, the latter showing a modification in the construction of the scoop.

Similar letters of reference indicate corresponding parts.

The scoop A is provided with a chute, B, projecting upward and outward at its front end, and is provided with sleeves at the sides, into which sleeve the knife-edges C at the forward end of a scale-beam, D, pass. Two pins or studs, E E, project from the sides of the scoop and fit into notches F in the end of the beam D, so that the scoop will be supported on the knife-edge only when in equilibrium; but as soon as it begins to turn the weight is supported by the beam by means of the studs E.

The beam D is provided with pivots having knife-edges G resting on suitable supports, H, and thus forming the fulcrum for the beam.

A hopper, J, is arranged directly above the scoop A, and is provided with a curved sliding gate, K, attached to a lever, I, and loosely mounted on a pivot, L, projecting from the hopper. The lever I is provided with a projecting arm carrying a counter-weight, N, and with a short arm, O, pivoted to a connecting-rod, P, provided at the lower end with a slot, R', into which a pin or stud, S, on the beam D, between the fulcrum of the beam and the upper end of the same, passes. An arm, Q, provided with a projection, R, is also attached to the lever I, or to the sleeve to which this lever I is attached, this projection R of the arm Q resting against the stud S, for a purpose set forth hereinafter. The scoop is balanced by a counter-weight, T. A bar or plate, U, arranged below and to the rear of the scoop prevents the same from descending farther than to a certain degree.

A receptacle, V, is arranged below the scoop to receive the material passing from the scoop when the same is tilted.

In the modification shown in Figs. 7, 8, 9, and 10 the beam D is branched in two arms, D' D², to which the hopper W and the scoop X are respectively rigidly attached in place of the scoop A, previously described. A segmental gate, A', fits over the outer end of the scoop X and is provided with side pieces, B', which are pivoted to the sides of the scoop in such a manner that the gate A' can slide over the end of the scoop X, and thus close the end opening, C', of the same.

Two curved symmetrical arms, E' and E², are attached to the ends of the side pieces, B', of the gate A' at the pivot, and by passing over a projection or stud, F', of the frame of the apparatus they open and close the gate A' as the scoop descends or ascends.

A plate, G', is attached to the outer end of a lever, H', provided at the other end with a counter-weight, J', and pivoted in such a manner that the plate G' is directly above the receptacle V below the scoop. A bar or plate, K', below the weight J', prevents this weight from descending more than to a certain degree.

The under side of the scoop X is provided with a pocket, L', into which a projection, M', of the lever H' fits, to hold the scoop in its lowered position until it is completely emptied.

In the modification shown in the lower part of Fig. 11 the scoop M is formed like a tapering box, and is provided at the bottom of its front end, N', with an opening closed by a gate, O', attached to arms P', pivoted to the scoop, and which strike against a stud or projection, F', of the frame of the apparatus when the scoop descends, whereby the gate O' is opened. The bottom Q' is also provided with a pocket, L', for the purpose described above.

The operation is as follows: If the scoop is in the position shown in Fig. 1, the beam D presses upward on the rod P, and thus holds the weight N raised, keeping the hopper-gate K open. The grain or other material passes from the hopper J into the scoop A, and the same will descend, thus permitting the rod P to descend, whereby the weight N is permitted to drop a short distance, thereby partially closing the gate K, as shown in Fig. 2; but by this movement of the weight the projection R of the lever or arm Q has been thrown against the stud or pivot S, and thus holds the weight N in position and prevents it from closing the gate K entirely; but as the scoop A and the beam D still descend the pivot S will pass down the slot or recess R' in the lower end of the rod Q and the weight N will close the gate K entirely, as indicated in Fig. 3; but in the meantime the scoop has been inclined, and the grain or other material passes down the inclined bottom and chute B of the scoop into the receptacle V, as shown in Fig. 3. As soon as the scoop is emptied the weight T will raise it, and the pivot or stud S will press the rod Q upward, thereby overcoming the weight and opening the gate K, when the above operation is again repeated.

The hopper-gate is operated in the same manner in all the apparatus shown; but in the apparatus shown in Figs. 7 to 10, inclusive, the curved arms E' and E² slide over the projection F' and raise the segmental gate A' as the scoop descends, thus permitting the grain to pass upon the plate G', which is depressed by the weight of the grain causing the projection M' to pass into the pocket L', thereby holding the scoop in the lowered position until all the grain has passed out of it. The weight J' will then raise the plate G', and the projection M' is drawn out of the pocket L', thus permitting the weight T to raise the scoop. The gate A' is closed automatically when the scoop X rises. The weighing apparatus shown in the lower part of Fig. 11 operates in a similar manner.

In Fig. 11 the grain or other material is first measured in the measuring device shown in the upper part, and is then weighed in the device shown in the lower part of Fig. 11.

Having thus fully described my invention, I claim as new and desire to secure by Letters Patent—

1. The scoop A, having an upwardly-projecting chute, B, with side sleeves and side studs, E E, in combination with the scale-beam D, provided with a knife-edge extending into said sleeves, and the notches F, receiving said studs, as shown and described, whereby the scoop is supported on knife-edge when in equilibrium, but on the studs at other times, as set forth.

2. In an apparatus for measuring and weighing, the combination, with the balanced scale-beam D, provided with a stud or pivot, S, of the scoop A, the hopper J, its gate K, the levers I O P Q, the projection R, and the weight N, substantially as herein shown and described, and for the purpose set forth.

This specification signed by me this 7th day of January, 1881.

ALEXANDER KAISER.

Witnesses:
SAMUEL SPACKMAN,
EMIL HENZEL.